Dec. 6, 1966 B. E. GUISINGER 3,290,518
CIRCUIT FOR DETECTING AMPLITUDE MODULATED PULSES APPEARING
IN FREQUENCY MODULATED WAVEFORMS
Filed Jan. 21, 1964 2 Sheets-Sheet 1
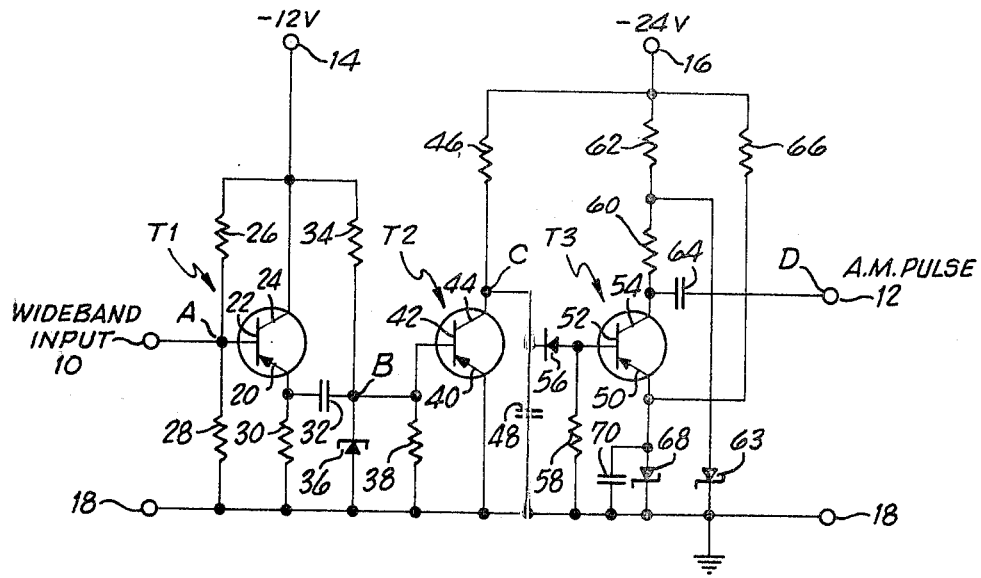
FIG_1
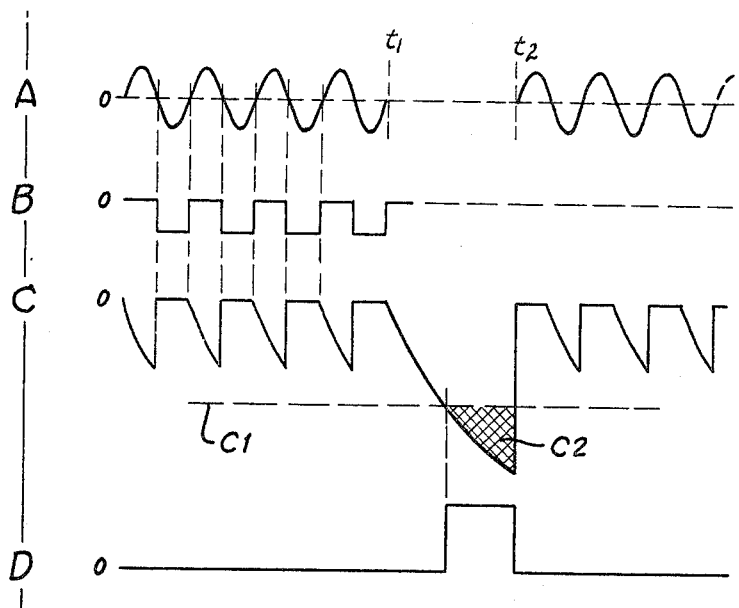
FIG_2
BARRETT E. GUISINGER
INVENTOR.
BY James H. Griffin
ATTORNEY

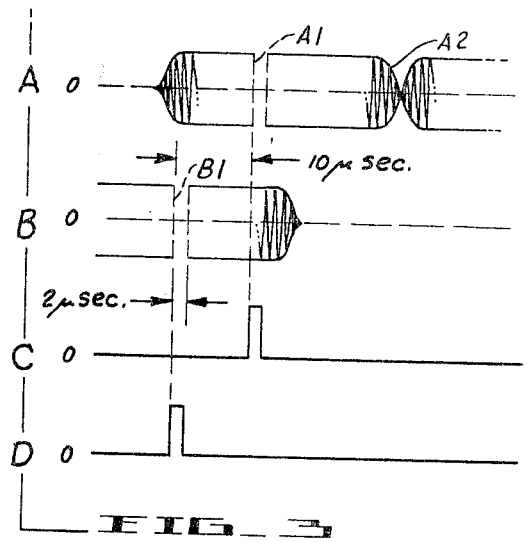
FIG_3
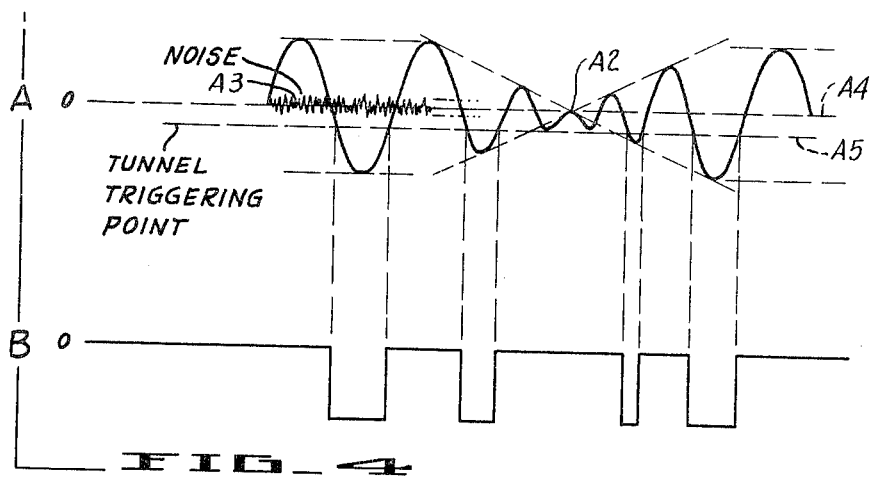
FIG_4
BARRETT E. GUISINGER
INVENTOR.
BY James H. Griffin
ATTORNEY

# United States Patent Office 3,290,518
Patented Dec. 6, 1966

3,290,518
CIRCUIT FOR DETECTING AMPLITUDE MODULATED PULSES APPEARING IN FREQUENCY MODULATED WAVEFORMS
Barrett E. Guisinger, Redwood City, Calif., assignor to Ampex Corporation, Redwood City, Calif., a corporation of California
Filed Jan. 21, 1964, Ser. No. 339,119
9 Claims. (Cl. 307—88.5)

This invention relates in general to pulse detectors and more particularly to those for detection of AM timing pulses as they appear in an FM signal.

The invention will be described in connection with a Wide Band Data Recording and Reproducing System of the type shown in U.S. Patent 3,012,106—Brenner, but it is to be understood that the invention may be applied wherever an amplitude modulated (AM) pulse detector is needed. In the operation of a rotary head magnetic tape recorder of the type shown in the patent, the tape passes between a rotating head drum and a movable female guide actuated by a servomotor. The female guide must press the moving tape into the exact proximity with the rotating heads necessary for recreating the original recording conditions during playback. As discussed in the patent to Brenner, this pressing is done in response to input signals to the guide servomotor whereby the movement of the female guide compensates for signal error by transverse stretching of the tape and like effects.

To micro-position the tape for accurate playback and the phase synchronization of the zero-crossings of signals from two channels, AM time pulses are marked with a time separation of $\Delta t$ on the overlapping ends of the (FM) carrier envelopes to be detected during playback and fed through a comparator which produces a servo signal based on deviation from the $\Delta t$ separation. This deviation, of course, is a function of the error caused by inaccurate positioning of the tape by the female guide.

Prior pulse detectors used to produce these AM pulses from the FM signal played from the tape were usually bridge rectifiers or else some other standard type of AM detector. Their greatest disadvantage was responding to spurious modulations of the incoming FM carrier, especially noise and dropouts, and thus producing wild behavior of the female guide servo. Gating was tried as one solution to this problem, but it was not a complete solution and also produced harmful distortions of its own.

The prior AM pulse detectors had additional drawbacks: they were not totally reliable in detecting the timed pulses that came through, and they had adjustment potentiometers that demanded continual attention as signal amplitude varied.

It is a general object of this invention to provide an improved AM pulse detector.

Another object of this invention is to provide a pulse detector that can discriminate pulse width.

Another object of the invention is to provide a pulse detector that will not respond to noise or dropouts.

Another object of the invention is to provide a pulse detector that is highly reliable in detecting every one of a certain desired input pulse type.

Another object of the invention is to provide a pulse detector that does not need an auxiliary gating circuit.

In the achievement of the above objects and as a feature of applicant's invention, there is provided an AM pulse detector having a tunnel diode that switches from conductive to nonconductive or the reverse whenever the FM carrier input crosses the zero reference level. As other features of the invention, the output of the tunnel diode alternately saturates and cuts off a first active element, the output of which may be applied across a charging capacitor. The longer the distance between zero-crossings, due to AM pulses of various widths, the longer between switches of the tunnel diode; thus, the longer the first switching element will remain in one state and the longer the capacitor will charge.

As another feature of applicant's invention, the voltage across the charging capacitor is applied to the control electrode of a second active element which is held cut off by reverse bias maintained by a Zener diode; thus, conduction by the second active element cannot occur unless the charging capacitor is allowed time enough to charge above the reverse bias. Since the conduction time of the capacitor depends ultimately on the zero-crossing to zero-crossing interval of the FM input, it will not cause the second active element to conduct save for AM pulses above a certain preset width. Thus, all noise and all but the very largest dropouts may be completely eliminated.

Other objects and features and a fuller understanding of the invention may be had by referring to the following description and claims, taken in conjunction with the accompanying drawing, in which:

FIGURE 1 is a schematic diagram of a preferred embodiment of applicant's pulse detector circuit;

FIGURE 2 is a graph of the waveforms at selected points in the circuit of FIGURE 1;

FIGURE 3 shows the input and output wave envelopes of two channels using applicant's circuit; and FIGURE 4 shows in detail the effect of noise and dropouts on the tunnel diode which is a feature of applicant's invention.

Referring to FIGURE 1, a preferred embodiment of applicant's invention, as used in magnetic tape recorders of the type shown in the above-cited patent, has an input terminal 10, output terminal 12 and power supplies 14, 16, herein specified as $-12$ and $-24$ volts, respectively. A ground terminal is shown at 18.

A transistor T1, having emitter 20, base 22, and collector 24, has its base 22 coupled to the input terminal 10. The collector 24 is directly coupled to the power supply 14. The base 22 is coupled to the power supply 14 through the resistor 26 and to ground 18 through the resistor 28.

Coupled between the emitter 20 and ground is the resistor 30; also coupled to the emitter is the capacitor 32, the other side of which is coupled to the power supply 14 through the resistor 34 and to ground 18 through the tunnel diode 36 in parallel with the resistor 38.

A transistor T2, having emitter 40, base 42, and collector 44, has its base 42 connected to the tunnel diode 36 and also between the resistors 34 and 38. The emitter 40 is grounded directly. The collector 44 is connected between a resistor 46 and a capacitor 48, which make up a R.-C. circuit running between the power supply 16 and ground 18.

A transistor T3, having emitter 50, base 52, and collector 54, has its base 52 coupled through a protective diode 56 to the collector 44. The base 52 is also grounded through a resistor 58. The collector 54 is coupled through resistors 60, 62 to the power supply 16 and through a capacitor 64 to the output terminal 12. A Zener diode 63 has one lead connected between the resistors 60, 62 and the other lead connected to ground 18.

The emitter 50 is connected between a resistor 66 running from the power supply 16 and a parallel circuit consisting of a Zener diode 68 and a capacitor 70 running to ground.

In the operation of the above-described circuit, the input waveform applied to the terminal 10 is an FM carrier as shown in FIGURE 2A. Between times $t_1$ and $t_2$, a 2 microsecond interval, an AM time pulse has been superimposed, as by a clamping circuit of conventional design. In FIGURE 3A and B, the input wave envelopes are shown for the two channels illustrated in the above-cited patent. AM time pulses, A1 and B1, appear with their leading edges 10 microseconds apart. At A2 the effect of a dropout upon the wave envelope is shown.

The input waveform first passes through the emitter follower circuit formed by the transistor T1 and the resistors 26, 28, and 30. The emitter follower serves the usual functions of isolating the circuitry going before from the circuitry to follow and of providing a low source impedance to the circuitry to follow, especially, in this case, to the tunnel diode 36. The signal at the emitter 20 is applied through the blocking capacitor 32 to the junction between the tunnel diode 36 and the base 42. The tunnel diode 36 switches alternately on or off with each zero crossing of the input waveform, producing the pulses shown in FIGURE 2B on the base 42. The effect of the resistors 34, 38 is to bias the tunnel diode to trigger at any desired crossing point of the input waveform herein specified for purposes of illustration as the zero reference level.

The switching of the tunnel diode 36, causing the waveform (B) at the base 42, alternately saturates and cuts off the transistor T2. Thus, the voltage at the collector 44 assumes the waveform illustrated in FIGURE 2C. When the transistor T2 is cut off, the capacitor 48 beings to charge along the path from the power supply 16 through the resistor 46 to ground 18. When the transistor T2 becomes saturated, the collector 44 is held very near the potential of ground 18. The signals shown at FIGURE 2C are applied through the protective diode 56 to the base 52 of the transistor T3.

The transistor T3 has its emitter 50 held at a certain desired voltage by the circuit consisting of the resistor 66, the Zener diode 68 and the bypass capacitor 70. The emitter 50 is thus negative of the base 52 by the Zener voltage when waveform (C) is at ground 18; and, accordingly, the transistor T3 is cut off. Although the charging of the capacitor 58 may cause the voltage at the base 52 to start negative, proper selection of the Zener diode 68 will insure that this negative-going voltage does not have time to grow below the Zener level C1 and thus start transistor T3 conducting. Only with AM input pulses of almost the same width as the time pulses to be detected will the R.-C. circuit made up of the resistor 46 and the capacitor 48 have time to push the voltage at the base 52 below the voltage maintained at the emitter 50 by the Zener diode 68 (cross-hatched area shown at C2).

When an AM input pulse (A1) is wide enough to cause the transistor T3 to conduct, the voltage at the collector 54 goes from the cut-off voltage maintained by the Zener diode 63 to a saturation voltage very near that of the Zener diode 68. Since the voltage across the capacitor 64 cannot change instantaneously, the sudden rise in voltage at the collector 54 is transmitted to the output terminal 12 as the positive AM pulse shown at FIGURE 2D. FIGURE 3C and D show the two output pulses produced by the two detectors 71, 72 in Brenner, FIGURE 2; these pulses are fed to the discriminator, from which the female guide servomotor control signal is derived.

The waveforms in FIGURE 4 illustrate the effectiveness of applicant's pulse detector in discriminating against noise A3 and dropouts A2. Since noise is centered about the zero reference A4, by lowering the triggering point of the tunnel diode 36 to a certain level A5 below the reference voltage A4, the effect of the noise will be eliminated. As to dropouts, it should be observed that the carrier waves in a dropout continue to trigger the tunnel diode until they are diminished to a very low amplitude. Thus, the gaps in the switching will rarely be large enough to allow the capacitor 48 to charge until the transistor T3 is saturated.

An AM pulse detector in accordance with the above description and drawing was built and operated using the following components.

Transistors:
   T1—2N2048
   T2—T2039
   T3—T2092
Diodes:
   36—1N2929
   56—S570G
   63—1N720A
   68—1N707
Resistors (Ohms):
   26—7.5K
   28—2K
   30—620
   34—20K
   38—1K
   46—3K
   58—15K
   60—1500
   62—510
   66—1K
Capacitors:
   32—.1 mf.
   48—330 pf.
   64—2.2 mf.
   70—2.2 mf.

Thus, applicant has provided an improved AM pulse detector that can discriminate pulse width and will not respond to noise or dropouts. As can be seen from the illustrative circuit described above, the new pulse detector is far less complex and costly than prior pulse detector circuits and yet extremely reliable and accurate.

A number of alternative arrangements will readily suggest themselves to those skilled in the art. For example, N-P-N conductivity type transistors may be employed instead of the P-N-P conductivity type shown merely by reversing the bias voltages. However, although the invention has been described with a certain degree of particularity, it is to be understood that the present disclosure has been made only by way of example and that numerous changes in the details of construction and the combination and arrangement of parts may be resorted to without departing from the spirit and the scope of the invention as hereinafter claimed.

What is claimed is:

1. A pulse detector for producing an output pulse in response to an AM input pulse superimposed upon an input waveform, comprising: means for switching alternately between a first voltage level and a second voltage level whenever the input waveform crosses a selected reference level, means for creating a voltage rise from an initial level in response to each interval at said first voltage level between alternate switches of the switching means, said voltage rise proportional to the length of said interval, means for resetting said voltage rise to said initial level in response to each interval at said second voltage level between alternate switches of the switching means, and an active switching element with control electrode coupled to receive the voltage rise and with bias circuitry including a Zener diode arranged to prevent switching of the active switching element until the voltage rise exceeds a selected value.

2. A pulse detector for producing an output pulse in response to an AM input pulse superimposed upon an input waveform, comprising: an emitter follower transistor circuit, a tunnel diode across which the output of the emitter follower is applied, a second transistor with its base directly coupled to the tunnel diode, a charging capacitor in parallel with the second transistor, a third transistor with its base coupled to the charging capacitor, and biasing circuitry for the third transistor including a Zener diode arranged to hold the emitter-base voltage of the third transistor a selected distance away from the forward biasing voltage.

3. A pulse detector for producing an output pulse in response to an AM input pulse superimposed upon an input waveform, comprising: cross-point-sensing means for switching alternately between a first voltage level and a second voltage level whenever the input waveform crosses a selected reference level, whereby an AM pulse will produce an interval at said first voltage level of no switching throughout its duration, means for creating a voltage rise from an initial level in response to each interval at said first voltage level between alternate switches of the switching means, said voltage rise proportional to the length of said interval, means for resetting said voltage rise to said initial level in response to each interval at said second voltage level between alternate switches of the switching means, and means for producing the output pulse whenever the voltage rise exceeds a selected value.

4. A pulse detector for producing an output pulse in response to an AM input pulse superimposed upon an input waveform, comprising: an input terminal, an emitter-follower transistor circuit coupled to the input terminal, a tunnel diode across which the output of the emitter-follower is applied, a second transistor with its emitter-base circuit including the tunnel diode in parallel with a resistor, a charging capacitor in the emitter-collector circuit of the second transistor, a third transistor with its base coupled to the charging capacitor, and biasing circuitry for the third transistor including a Zener diode arranged to hold the emitter-base voltage of the third transistor a selected distance away from the forward biasing voltage.

5. A pulse detector for producing an output pulse in response to an AM input pulse superimposed upon an input waveform, comprising: an input terminal, an emitter follower transistor circuit coupled to the input terminal, a blocking capacitor at the output terminal of the emitter follower, a tunnel diode coupled to the blocking capacitor, a second transistor with its emitter-base circuit made up of the tunnel diode in parallel with a resistor, a charging capacitor in the emitter-collector circuit of the second transistor, a third transistor with its base coupled to the charging capacitor, biasing circuitry for the third transistor including a Zener diode arranged to hold the emitter-base voltage of the third transistor a selected distance away from the forward biasing voltage, and a collector circuit for the third transistor including two resistors coupled between the collector of the third transistor and a power supply and a Zener diode connected between the two resistors.

6. A pulse detector for producing an output pulse in response to an AM input pulse superimposed upon an input waveform comprising: an input terminal, a ground terminal, a first power supply, a first transistor having emitter, base, and collector, the base of the first transistor being coupled directly to the input terminal and through a first resistor to ground, the emitter of the first transistor being coupled through a second resistor to ground, and the collector of the first transistor being coupled directly to the first power supply, a first capacitor directly coupled to the emitter of the first transistor, a tunnel diode coupled between the other end of the first capacitor and ground, a third resistor coupled between the other end of the first capacitor and the first power supply, a second transistor having emitter, base, and collector, the emitter of the second transistor being coupled directly to ground, the base of the second transistor being coupled through a fourth resistor to ground and directly to the junction between the first capacitor and the tunnel diode, the collector of the second transistor being coupled through a fifth resistor to a second power supply through a second capacitor to ground, and through a blocking diode to the base of a third transistor having emitter, base, and collector, a first Zener diode connected to the emitter of the third transistor, a sixth resistor connected between the second power supply and the emitter of the third transistor, a second Zener diode connected through a seventh resistor to the collector of the third transistor and through an eighth resistor to the second power supply, and an output terminal coupled through a third capacitor to the collector of the third transistor.

7. A pulse detector for producing an output pulse in response to an AM input pulse superimposed upon an input waveform comprising: an input terminal, a ground terminal, a first power supply, a tunnel diode coupled between the input terminal and ground, a first resistor coupled between the capacitor and the first power supply, a first transistor having emitter, base, and collector, the emitter of the first transistor being coupled directly to ground, the base of the first transistor being coupled through a second resistor to ground and directly to the input terminal, the collector of the second transistor being coupled through a third resistor to a second power supply, through a first capacitor to ground, and through a blocking diode to the base of a second transistor having emitter, base, and collector, a first Zener diode connected to the emitter of the second transistor, a fourth resistor connected between the second power supply and the emitter of the second transistor, a second Zener diode connected through a fifth resistor to the collector of the second transistor and through a sixth resistor to the second power supply, and an output terminal coupled through a second capacitor to the collector of the second transistor.

8. A pulse detector for producing an output pulse in response to an AM input pulse superimposed upon an input waveform comprising: an input terminal, a ground terminal, a first power supply, a first transistor having emitter, base, and collector, the base of the first transistor being coupled directly to the input terminal, the collector of the first transistor being coupled directly to the first power supply, and the emitter of the first transistor being coupled directly to a first capacitor, a tunnel diode coupled to the other end of the first capacitor, a second transistor having emitter, base, and collector, the emitter of the second transistor being coupled directly to ground, the base of the second transistor being coupled directly to the junction between the first capacitor and the tunnel diode, the collector of the second transistor being coupled indirectly to a second power supply, through a second capacitor to ground, and through a blocking diode to the base of a third transistor having emitter, base, and collector, a first Zener diode connected to the emitter of the third transistor, and an output terminal coupled through a third capacitor to the collector of the third transistor.

9. A pulse detector for producing an output pulse in response to an AM input pulse superimposed upon an input waveform comprising a tunnel diode, means coupling said input waveform across said tunnel diode, means biasing said tunnel diode to switch alternately between first and second voltage levels responsive to said input waveform crossing a predetermined reference level, a transistor having its base connected to said tunnel diode, means coupled to the emitter and collector of said transistor to bias same for conduction responsive to said first voltage level and non-conduction responsive to said second voltage level, a charging capacitor connected in parallel with the emitter and collector of said transistor, a second transistor having its base coupled to said capacitor, and biasing means connected to said second transistor to render same non-conducting until said capacitor charges to a predetermined potential.

References Cited by the Examiner
UNITED STATES PATENTS 3,191,065 6/1965 Vargiu _____ 307—88.5
3,191,066 6/1965 Staudenmayer _____ 307—88.5
3,231,764 1/1966 Thornberg et al. ____ 307—88.5

ARTHUR GAUSS, *Primary Examiner.*

J. BUSCH, *Assistant Examiner.*